United States Patent
Luttrell et al.

(10) Patent No.: US 9,892,039 B2
(45) Date of Patent: Feb. 13, 2018

(54) NON-TEMPORAL WRITE COMBINING USING CACHE RESOURCES

(71) Applicant: Oracle International Corporation, Redwood City, CA (US)

(72) Inventors: Mark Luttrell, Cedar Park, TX (US); David Smentek, Cupertino, CA (US); Ramaswamy Sivaramakrishnan, San Jose, CA (US); Serena Leung, South San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 388 days.

(21) Appl. No.: 14/691,971

(22) Filed: Apr. 21, 2015

(65) Prior Publication Data
US 2016/0314069 A1 Oct. 27, 2016

(51) Int. Cl.
| | |
|---|---|
| *G06F 12/00* | (2006.01) |
| *G06F 12/0811* | (2016.01) |
| *G06F 12/128* | (2016.01) |
| *G06F 12/0817* | (2016.01) |
| *G06F 12/0831* | (2016.01) |

(52) U.S. Cl.
CPC ...... *G06F 12/0811* (2013.01); *G06F 12/0817* (2013.01); *G06F 12/0831* (2013.01); *G06F 12/128* (2013.01); *G06F 2212/283* (2013.01); *G06F 2212/622* (2013.01)

(58) Field of Classification Search
CPC .................................................. G06F 12/0815
See application file for complete search history.

(56) References Cited

U.S. PATENT DOCUMENTS

| | | | |
|---|---|---|---|
| 6,374,330 B1 * | 4/2002 | Arimilli | G06F 12/0811 711/117 |
| 8,751,736 B2 | 6/2014 | Radovic | |
| 8,756,363 B2 | 6/2014 | Radovic | |
| 9,043,559 B2 | 5/2015 | Radovic | |
| 9,146,774 B2 | 9/2015 | Busaba | |
| 2009/0254738 A1 * | 10/2009 | Sato | G06F 21/52 712/226 |

* cited by examiner

*Primary Examiner* — Reginald Bragdon
*Assistant Examiner* — Hannah A Faye-Joyner
(74) *Attorney, Agent, or Firm* — Meyertons, Hood, Kivlin, Kowert & Goetzel, P.C.; Erik A. Heter

(57) ABSTRACT

A method and apparatus for performing non-temporal write combining using existing cache resources is disclosed. In one embodiment, a method includes executing a first thread on a processor core, the first thread including a first block initialization store (BIS) instruction. A cache query may be performed responsive to the BIS instruction, and if the query results in a cache miss, a cache line may be installed in a cache in an unordered dirty state in which it is exclusively owned by the first thread. The first BIS instruction and one or more additional BIS instructions may write data from the first processor core into the first cache line. After a cache coherence response is received, the state of the first cache line may be changed to an ordered dirty state in which it is no longer exclusive to the first thread.

20 Claims, 3 Drawing Sheets

| Set | Way | Mem Addr |
|---|---|---|
| Set | Way | Mem Addr |
| Set | Way | Mem Addr |
| Set | Way | Mem Addr |
| Set | Way | Mem Addr |
| Set | Way | Mem Addr |
| Set | Way | Mem Addr |
| Set | Way | Mem Addr |

| V | U | D | Data Word | Data Word | • • • | Data Word |
|---|---|---|---|---|---|---|

Fig. 2B

NON-TEMPORAL WRITE COMBINING USING CACHE RESOURCES

BACKGROUND

1. Technical Field

This disclosure relates to computer systems, and more particularly, to mechanisms for performing stores of data in a memory of a computer system.

2. Description of the Related Art

In many instruction set architectures, writes to memory are performed responsive to execution of a store instruction. Typical store instructions cause a write of data having a size (i.e. data width) equal to that of a general purpose register in that architecture (e.g., 64 bits in a 64-bit architecture). Data of this width may be written to a cache or even to memory itself responsive to execution of a store instruction. However, writing data at a data width of a general purpose register can be inefficient, particularly when executing processes which include a high number of writes to memory.

To alleviate the inefficiencies of performing a high number of writes of a limited data width, some processors may implement a structure known as a write combine buffer. A write combine buffer may receive writes from a processor core (e.g., from a store queue thereof) at the register data width. The writes may occur within a certain region of the memory space, such as a cache line. Once all the writes have been written to the cache line in the write combine buffer, the entire cache line may then be propagated to a cache memory and/or to memory.

For a single threaded processor, a single write combine buffer may be implemented. Multiple write combine buffers may be implemented for multi-threaded processors. Each write combine buffer may include storage for an address and data for each cache line that may be written thereto. For each write to a write combine buffer, all addresses stored therein may be tested in parallel, and thus the structure may be fully associative.

SUMMARY OF THE DISCLOSURE

A method and apparatus for performing non-temporal write combining using existing cache resources is disclosed. In one embodiment, a method includes executing a first thread on a processor core, the first thread including a first block initialization store (BIS) instruction. A cache query may be performed responsive to the BIS instruction, and if the query results in a cache miss, a cache line may be installed in a cache in an unordered dirty state in which it is exclusively owned by the first thread. The first BIS instruction and one or more additional BIS instructions may write data from the first processor core into the first cache line. A cache coherence transaction is initiated to establish ownership of the cache line to the first processor core. The BIS instructions may write data into the first cache line while the coherence transaction is still pending, in the unordered dirty state. After a cache coherence response is received, the state of the first cache line may be changed to an ordered dirty state in which it is no longer exclusive to the first thread.

In one embodiment, a system includes a processor having one or more processor cores, with each core being capable of executing instructions from multiple threads. The system also includes a level two (L2) cache subsystem and a level three (L3) cache subsystem. Each processor core may also include a store queue, which provides temporary storage for a limited number of data items to be written back to main memory of the system. Responsive to a thread executing a BIS instruction on one of the processor cores, cache queries may be conducted on the L2 and L3 caches. If the queries result in a cache miss (in this case, a write cache miss), then instead of fetching data, the L3 cache will return all zeros to the L2 cache, instead of fetching the cache line from memory. Thereafter, the cache line with all zeros is installed in the L2 cache and placed in an unordered dirty state in which it is exclusively owned and exclusively visible to the thread having the BIS instruction. The BIS instruction may write data into the cache line. One or more additional BIS instructions may also write data into the cache line while it remains in the unordered dirty state, until a cache coherence response is returned. Responsive to receiving the cache coherence response, the L3 cache subsystem may update a directory to indicate the set/way of the cache line in the L2 cache. An indication of this update may be forwarded to the L2 cache, which may change the state of the line to an ordered dirty state. When in the ordered dirty state, the cache line may be visible to other threads and/or processor cores.

During the time that the cache line is in the unordered dirty state, it may be excluded from snoops by other threads/cores, and may also be invisible to other threads/cores. Furthermore, the cache line may be inhibited from being written back (to a lower level cache or main memory), and may also be inhibited from being written to by any other thread or core, or any other store instruction within the thread save for the BIS instructions.

BRIEF DESCRIPTION OF THE DRAWINGS

Other aspects of the disclosure will become apparent upon reading the following detailed description and upon reference to the accompanying drawings which are now described as follows.

FIG. 2A is a diagram illustrating one embodiment of a cache directory.

FIG. 2B is a diagram illustrating one embodiment of a cache line.

Figure 1:
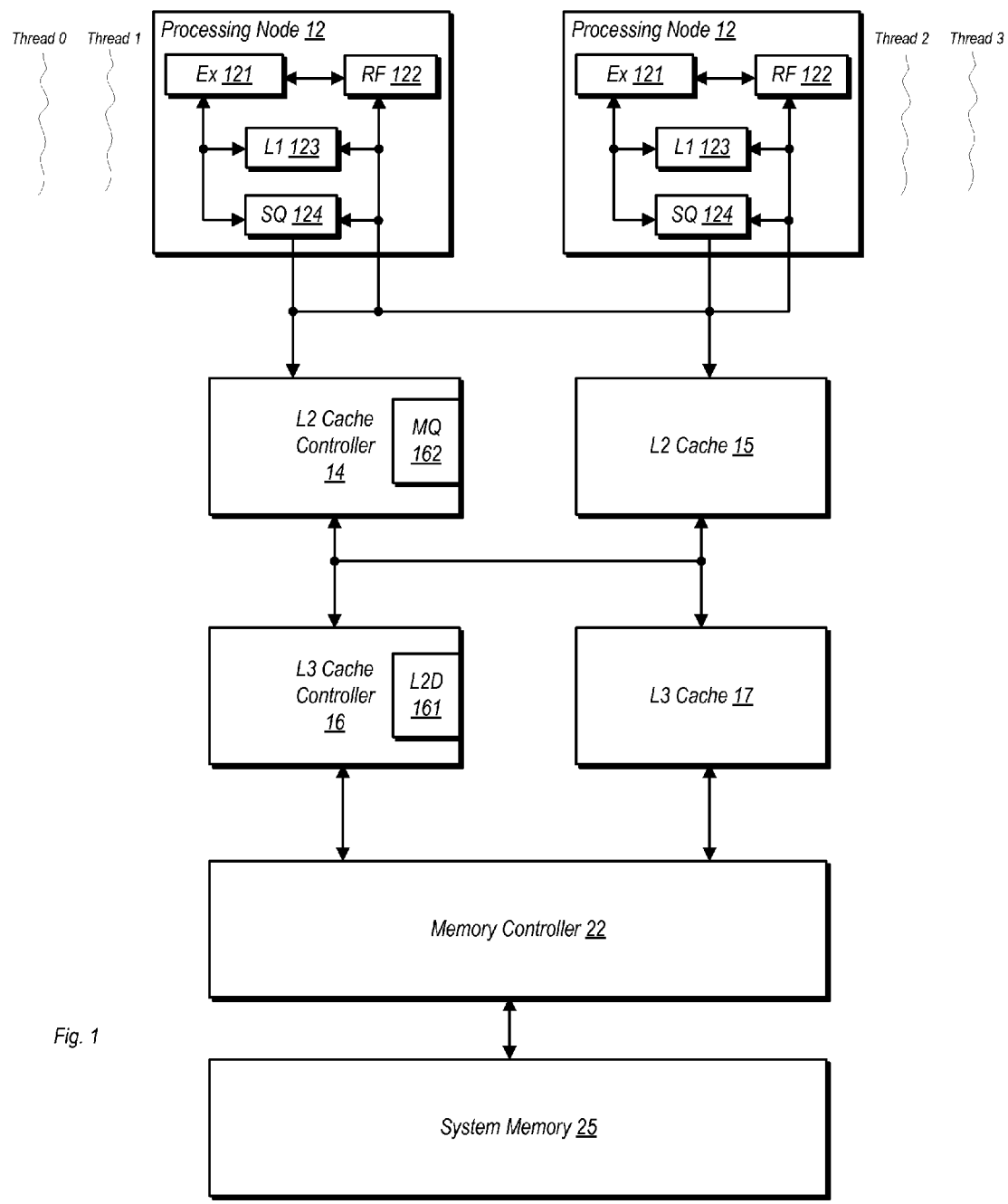
FIG. 1 is a block diagram illustrating one embodiment of a system having multiple processor cores.

While the subject matter disclosed herein is susceptible to various modifications and alternative forms, specific embodiments thereof are shown by way of example in the drawings and will herein be described in detail. It should be understood, however, that the drawings and description thereto are not intended to be limiting to the particular form disclosed, but, on the contrary, is to cover all modifications, equivalents, and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component.

DETAILED DESCRIPTION

Turning now to FIG. 1, a block diagram of one embodiment of a system is shown. In the embodiment shown, system 10 includes multiple processing nodes (or cores) 12. Each processing node 12 includes at least one execution unit 121, a register file 122, at least one Level 1 (L1) cache, and a store queue 124. Although two processing nodes 12 are shown here, a greater or lesser number may be present in other embodiments of a system. Generally speaking, the number of processing nodes and caches in a given embodiment of a computer system may be any feasible number, and may thus fall within the scope of this disclosure. Furthermore, various embodiments of the methodology discussed below may be performed on such systems.

Execution unit 121 may execute instructions, and may do so using operands retrieved from register file 122. In addition, results of instructions may be stored in register file 122. Results of instructions may also be stored in L1 cache 123. In one embodiment, L1 cache 123 is a data cache configured to store data. A separate L1 cache may be implemented to store instructions, although it is not shown here for the sake of simplicity.

Processing nodes 12 in the embodiment shown are configured for multi-threading, i.e. they concurrently execute multiple instruction threads (sequences of instructions). In this example, a first processing node 12 is executing instruction threads 0 and 1, while the second processing node 12 is executing instruction threads 2 and 3. In practice, the number of instruction threads concurrently executed by a given processing node 12 may at times be greater than two. For example, multi-threaded processing nodes configured to execute up to eight or more threads concurrently are possible and contemplated.

Data that is to be written back to memory may be temporarily stored in store queue 124. The store queue 124 may provide buffering for a limited number of entries to be written back to memory. In the embodiment shown, each entry of store queue 124 may have a data width equal to the data width of one word as processed by system 10. For example, if the data width is 64 bits (i.e. one word=64 bits, or 8 bytes), then each entry is of the same width. The number of entries may be limited, e.g., to 64 entries. Data may be written back to memory (and to lower level caches) responsive to execution of various types of store instructions, as is discussed in further detail below.

The store queues 124 of each processing node 12 in the illustrated embodiment are coupled to a Level Two (L2) cache subsystem. The L2 cache subsystem as shown here includes L2 cache controller 14 and L2 cache 15. Data to be written back to main memory may also be written into L2 cache 15, under the control of L2 cache controller 14. L2 cache 15 is considered to be lower in the cache hierarchy than the L1 caches 123 of processing nodes 12. L2 cache 15 in the embodiment shown may be larger than either of L1 caches 123. In some embodiments, L2 cache 15 may be larger than both (or all) L1 caches 123 combined. As such, all data stored in each L1 cache 123 may also be stored in L2 cache 15, along with additional data (and in some embodiments, instructions) not stored in higher level caches.

L2 cache 15 may be configured to store a number of cache lines of data. Each cache line may store a number of data words. In one exemplary embodiment, each cache line may store eight words of 64 bits each. However, the number of words, and the number of bits per word may vary from one embodiment of system 10 to another. L2 cache 15 in various embodiments may be either a fully associative cache, a set-associative cache, or a direct-mapped cache.

L2 cache controller 14 may perform various actions for controlling and managing data in L2 cache 15. Among these functions include installing cache lines, evicting cache lines, snooping the cache responsive to a query, marking cache lines as dirty or clean, marking cache lines as valid or invalid, granting exclusive ownership to cache lines and inhibiting access thereto by threads/processing nodes that do not have ownership, writing back data to lower level caches and memory, and so forth. L2 cache controller 14 may also communicate with other units in the system in ensuring cache coherency (i.e., ensuring consistency for all copies of a given cache line or data word stored in various caches and system memory). L2 cache controller 14 also includes miss queue 162, which may store a record of misses to L3 cache 17, thereby indicating outstanding transactions. In addition to storing a record of misses to L3 cache, miss queue 162 may also store records of attempted accesses to cache lines that are locked and exclusive, e.g., to a particular thread, by another thread that does not have ownership.

System 10 further includes a Level three (L3) cache subsystem, which itself includes L3 cache controller 16 and L3 cache 17. L3 cache 17 in the embodiment shown may be larger (in terms of storage capacity), and may thus store all data that are stored in L2 cache 15, along with additional data not stored therein. The cache lines may be configured the same as L2 cache 15 and those of the L1 caches 123. Furthermore, L3 cache 17 may be fully associative, set-associative, or direct-mapped.

L3 cache controller 16 may perform similar functions with respect to L3 cache 17 that are performed by L2 cache controller 14 with respect to L2 cache 15. In this particular embodiment, L3 cache controller also includes an L2 directory 161. L2 directory 161 may store records of all lines stored in L2 cache 15. Accordingly, any cache line in L2 cache 15 that is valid and accessible may have a corresponding entry in L3 cache controller 161.

An example of L2 directory 161 is shown in FIG. 2A. In this particular embodiment, L2 directory 161 stored entries corresponding to a set-associative cache, and thus L2 cache is therefore set-associative. Each entry includes a set and way within L2 cache 15 in which the entry is stored. Additionally, the memory address (i.e. the address in system memory to which the data belongs) is also part of each entry.

System 10 includes a memory controller 22 that is coupled to L3 cache subsystem. Memory controller 22 is also coupled to a system memory 25, and may perform various memory management functions. Among the functions performed by memory controller 22 is the reading of data from system memory 25 and writing data thereto. Data may also be provided by memory controller 22 to storage locations of the various levels of cache memory. Memory controller 22 may also maintain a page directory that indicates the addresses at which various pages are stored in memory, as well as indicating cache locations at which the corresponding pages may be stored.

Each of the processing nodes 12 in the embodiment shown is configured to execute store instructions. A store instruction, when executed, causes data to be written back to memory. The data may also be written to one or more of the caches. The data to be written back may be provided from a store queue 124 of the processing node 12 that is executing the store instruction. Responsive to the execution of the store instruction, the word may be written into a location within a corresponding cache line. This in turn may result in a query of one or more of the caches in system 10. If the cache line to which the data word belongs is not in a cache, a cache miss known as a write miss occurs. Thereafter, the line to which the word belongs is loaded into at least one of the caches of the system, and subsequently the word is written thereto.

For typical store instructions, the stores must be performed in a specified order, i.e. the program order. Such store instructions are referred to as ordered stores. For some operations, the ordering may not be necessary. For example, in copy operations, i.e. where data is copied from one memory location to another, it is not always necessary that the date be copied in any specific order. Thus, enforcing ordering may in some cases slow down copy operations. Furthermore, loading cache lines responsive to write cache misses may provide an additional negative impact on performance.

In the embodiment shown, each of processing nodes 12 is configured to execute an instruction known as a block initialization store (BIS). The BIS instruction may be used to perform unordered stores during operations such as copy operations. Furthermore, utilizing the BIS instruction, existing cache resources may be used to perform write combining operations, irrespective of whether system 10 includes any write combine buffers. Execution of a BIS instruction in this embodiment guarantees that an entire cache line is going to be written by the executing processor node 12. As such, there is no need to fetch data from either memory or another cache. Instead, as is explained below, the cache line is initialized to all zeros and stores (writes) occurring to thereafter.

During operations such as a copy operation, one or more BIS instructions may be executed by a given thread. However, instead of loading a cache line from memory, the L3 cache subsystem may grant a return zeros (RTOZ) request, in which no cache line is loaded from memory, and instead all zeros are returned to the L2 cache. The L2 cache may then install a cache line with all zeros. The newly installed cache line may be marked as an unordered dirty line, and may be granted exclusive ownership to the thread from which the BIS instruction was executed. The data to be stored responsive to execution of the BIS instruction may then be written into a location in the cache line. Subsequent BIS instructions may cause data to be stored in other locations within the cache line. This may be performed without ordering constraints, i.e. the data written into the cache line in any order and without regard to the particular program order. When in the unordered dirty state, the cache line is invisible to other processing nodes and other threads, i.e. only the thread that is performing the stores to the cache line may have any visibility thereto.

Writing into a cache line in an unordered dirty state responsive to the execution of BIS instructions may occur in parallel with the pending of a cache coherence transaction. In general, a cache coherence transaction may be initiated by an agent that wishes to establish exclusive ownership of a cache line such that writes thereto may be performed. During the coherence transaction, it may be established as to whether other agents in the system may also have ownership of that cache line. If, for example, the cache line is also stored in another cache, the cache line may be invalidated in that cache. Once it is established that the cache line is not validly stored in any other cache (i.e. not present in the cache or invalidated responsive to the coherence transaction), a coherence response is sent to the requesting agent. Upon receiving the coherence response, exclusive ownership to the cache line is granted. If the cache line is in the unordered dirty state, it may be placed into an ordered dirty state responsive to the coherence response being returned. At this point, the cache line becomes visible to the rest of the system. In one embodiment, memory controller 22 may include a directory (not shown) that stores information indicating all cache lines in the system and where they are currently stored. In other embodiments, snoops of the various caches may be used to determine if a particular cache line is stored in the various caches of the system.

An exemplary cache line for L2 cache 15 is shown in FIG. 2B. In the example shown, cache line 151 includes a number of locations to store data words (e.g., of 64 bits, although other suitable word sizes may be used in other embodiments). In addition, cache line 151 includes three additional bits that convey status information. A first bit is a valid bit ('V'), which indicates whether or not the line is valid. A line that is not valid may be a candidate for eviction from the cache when a new line is to be loaded, and is typically not written to or read from. The dirty bit ('D') may be set when one or more of the words in the cache line have been modified relative to the data stored at the corresponding address in system memory 25. The unordered bit ('U') may be set when cache line 151 is in an unordered dirty state wherein unordered writes are permitted thereto. In this embodiment, the unordered bit is typically set along with the dirty bit when in the unordered dirty state. When in the unordered dirty state, the cache line may be visible only to a single thread which is executing BIS instructions causing stores to that line. Furthermore, in various embodiments discussed herein, a cache line may be in an unordered dirty state only when a coherence transaction is pending. Once a coherence response has been returned, the cache line is updated from the unordered dirty state to an ordered dirty state and becomes visible to other threads and processing nodes 12 of the system.

Upon installing the cache line that is owned by the thread from which the initial BIS instruction was executed, no update is initially made to L2 directory 161. Thus, since there is no directory entry for the cache line in L2 directory 161, other threads are effectively inhibited from initiating snoops thereof. Furthermore, when the cache line is in the unordered dirty state, L2 cache control 14 inhibits it from being selected for eviction. Moreover, no write back of data from the cache line to system memory 25 is permitted while it remains in the unordered dirty state. Furthermore, instructions within the owning thread, other than BIS instructions, are prohibited access to the line. That is, no other instructions can write data into the line or read data therefrom.

The thread may continue writing data into the unordered dirty cache line until a cache coherence response is returned. Meanwhile, L3 cache controller 161 will abstain from placing an entry corresponding to the line in L2 directory 161 until the coherence response is returned. Once the coherence response is returned, a directory entry corresponding to the cache line is placed in L2 directory 161. Concurrently, L3 cache controller will also provide an indication that L2 cache directory 161 has been updated to include an entry for that cache line. Responsive to receiving the indication, L2 cache controller 14 may change the state of the line from an unordered dirty state to an ordered dirty state, and may remove thread exclusive ownership therefrom. In removing the cache line from the unordered dirty state, the unordered bit may be reset, although the dirty bit will remain set. Thereafter, the cache line may be eligible for snooping by any thread, for write back to memory, for eviction from L2 cache 15, and so on.

Subsequent to executing the BIS instructions of the thread and completion of writing to the cache line, a memory barrier instruction may be executed by the processor core 12 from the initiating thread. A memory barrier instruction is an instruction that enforces ordering. Accordingly, after the completion of writes to the previously unordered dirty cache line, ordering is enforced. That is, each of the writes performed responsive to BIS instructions issued in the initiating thread prior to the memory barrier instruction are guaranteed to be performed prior to any memory operations on that cache line that were issued after the memory barrier instruction.

The utilization of BIS instructions and the placing of cache lines in the unordered dirty state may effectively allow lines in the L2 cache to be utilized for write combining purposes, in lieu of adding additional write combine buffers, which can be expensive, complex, and consume significant amounts of circuit area. Thus, the methodology discussed herein may be particularly suitable for copy operations and/or other data operations in which enforcement of strict ordering is not necessary to complete the operations, and in which store instructions may be generated at a high rate. Furthermore, allowing BIS instructions to store data into a cache line while a cache coherence transaction is still pending may result in significant performance improvements with regard to the latency of completing such stores. In systems with a large number of processing nodes and caches, conducting a coherence transaction to establish exclusive ownership of a given cache line can incur a significant latency. However, in using the BIS instructions (guaranteeing that the entire cache line is to be overwritten) and keeping the cache line in a non-visible state with respect to other threads, the stores thereto may, at least initially, be performed in a non-coherent fashion. Once the coherence response is returned, thereby establishing exclusive ownership to the cache line, any remaining stores required to complete overwriting the cache line may be performed, in coherent fashion, with the cache line visible to the remainder of the system.

Figure 3:
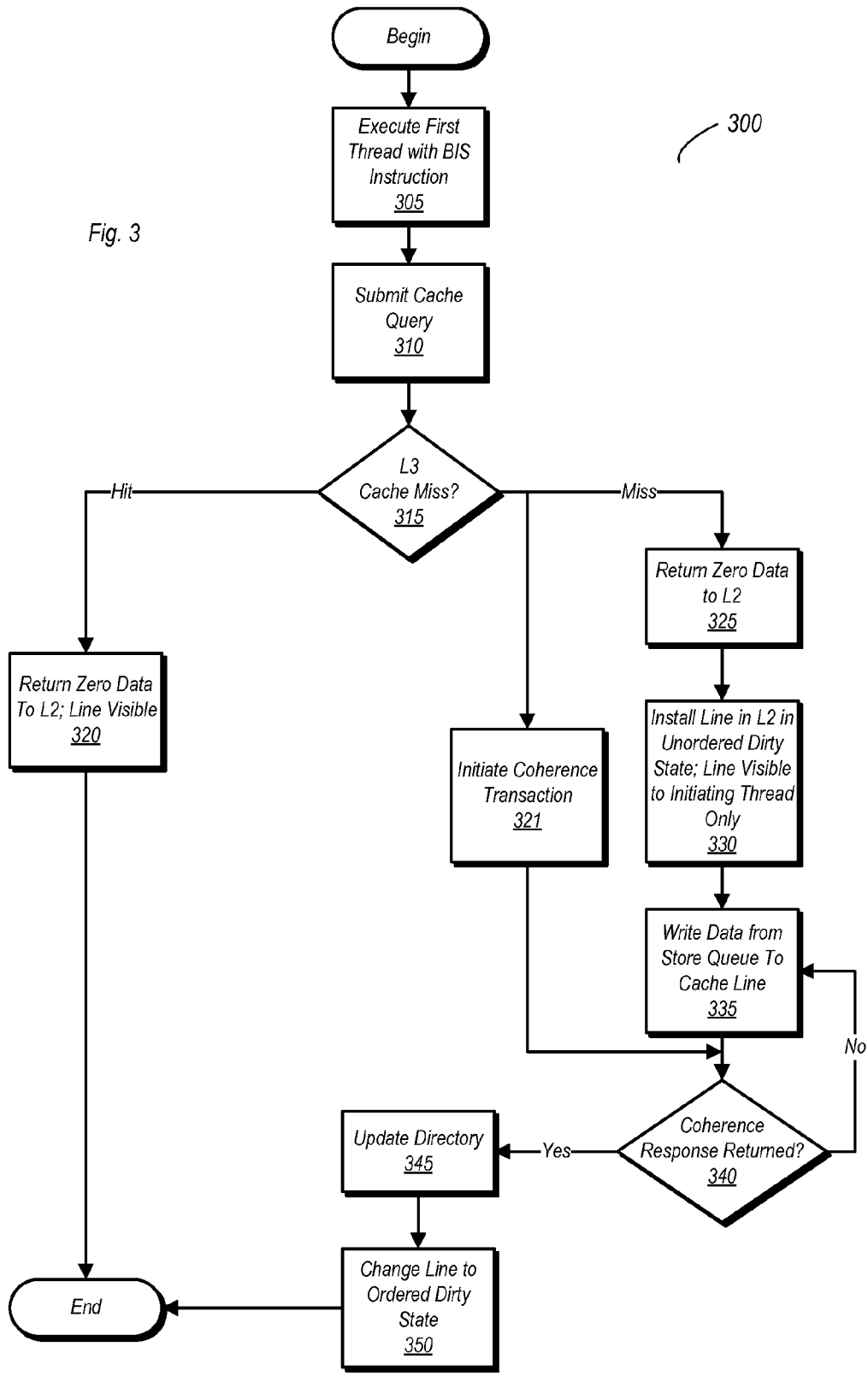
FIG. 3 is a flow diagram illustrating one embodiment of a method for using existing cache resources to perform write combining.

Turning now to FIG. 3, a flow diagram of one embodiment of a method for using existing cache resources to perform write combining is shown. The embodiment of method 300 discussed herein may be performed with embodiments of the hardware discussed above and variations thereof. It is also possible and contemplated that other hardware embodiments not explicitly discussed herein may perform method 300. Furthermore, while method 300 as discussed herein is performed using the L2 cache to receive data responsive to the execution of BIS instructions, embodiments that use other levels of cache for this function are possible and contemplated.

Method 300 begins with the execution of a thread on a processing node/core that includes a BIS instruction (block 305). Upon execution of the first BIS instruction in the thread, at least one cache query may be performed (block 310). The cache query may search a cache or caches for a cache line to which the data to be stored belongs. In some embodiments, multiple levels of cache may be queried. In another embodiment, the last level cache (e.g., the L3 cache in this example) may be queried first or may be the only cache queried.

If a query to the L3 cache results in a cache hit (block 315, hit), then zero data is returned to the L2 cache, and a cache line is installed therein as a valid (and visible) line (block 320). However, if the query to the L3 cache results in a cache miss (block 315, miss), then zero data is returned to the L2 cache (block 325), and a cache line having the zero data is installed therein as an unordered dirty line, with the line being visible only to the initiating thread (block 330). As defined herein, the visibility of a cache line to only the initiating thread means that no other thread is aware of the cache line, and thus cannot snoop the line or write data thereto. The cache line may not be evicted from the cache or written back to system memory. Moreover, a directory of the L2 cache (e.g., such as L2 directory 161 discussed above) is not updated to indicate the installation of the line or presence thereof. Accordingly, only the initiating thread is aware of the cache line and has any ability to perform operations thereon. In parallel with the zero data being returned to the L2 cache, a cache coherence transaction is initiated to established ownership of the cache line to the thread from which the BIS instruction was executed (block 321).

Following installation of the cache line, a data word may be written from the store queue into the cache line (block 335). If a cache coherence response has not been returned, i.e., the coherence transaction is not complete and ownership of the cache line is not established (block 340, no), the method returns to block 335 and the writing of data continues. It is noted that in some embodiments, only BIS instructions in the thread may cause writes to the unordered dirty line, whereas writes resulting from other types of store instructions are prohibited. Writes in the unordered dirty state may continue until a coherence response is returned and the L2 cache controller receives an indication that the L2 cache directory has been updated. Once the coherence response is returned (block 340, yes), the L2 cache directory may be updated (block 345). After the updating of the directory is complete, an indication of the same may be provided to the L2 cache controller. Responsive to receiving the indication, the L2 cache controller may change the line from an unordered dirty state to an ordered dirty state (block 350). The updating of the directory and the changing of the line to the ordered dirty state may make the line visible and available to other threads. Furthermore, the line may be available for eviction, write back, and so forth. If any remaining writes to the cache line are pending, they may be completed by the thread in the ordered dirty state, with the thread having established exclusive ownership of the line via the coherence transaction and response.

Numerous variations and modifications will become apparent to those skilled in the art once the above disclosure is fully appreciated. It is intended that the following claims be interpreted to embrace all such variations and modifications.

What is claimed is:

1. A method comprising:
executing a first thread on a processor core, wherein executing the first thread includes executing a first block initialization store (BIS) instruction;
responsive to executing the first BIS instruction, performing a query of a first cache for a first cache line corresponding to data to be written from the processor core;
responsive to a cache miss resulting from the query of the first cache, installing the first cache line in a second cache, wherein the second cache is a higher level cache than the first cache, and wherein installing the first cache line comprises placing the first cache line in an unordered dirty state in which the first cache line is exclusively dedicated to the first thread;

writing data from the first processor core into the first cache line responsive to execution of the first BIS instruction and one or more additional BIS instructions; and changing a state of the first cache line to an ordered dirty state responsive to receiving a cache coherence response, wherein the cache line is not thread exclusive when in the ordered dirty state.

2. The method as recited in claim 1, further comprising inhibiting writing back contents of the first cache line when the first cache line is in the unordered dirty state.

3. The method as recited in claim 1, further comprising inhibiting snooping the first cache line when the first cache line is in the unordered dirty state.

4. The method as recited in claim 1, further comprising inhibiting the first cache line from being evicted from the second cache when the first cache line is in the unordered dirty state.

5. The method as recited in claim 1, further comprising a cache controller associated with the first cache maintaining a directory indicative of cache lines stored in the second cache, wherein the directory does not include information pertaining to the first cache line when the first cache line is in the unordered dirty state.

6. The method as recited in claim 5, wherein placing the first cache line in the ordered dirty state comprises updating the directory to include information pertaining to the first cache line.

7. The method as recited in claim 6, further comprising updating the directory responsive to receiving the cache coherence response.

8. The method as recited in claim 1, further comprising writing data from a store queue of the processor core responsive execution of the first BIS instruction and the one or more additional BIS instructions.

9. The method as recited in claim 8, further comprising writing data from the store queue into the first cache line until the cache coherence response is received, wherein each write of data from the store queue into the first cache line is conducted responsive to execution of a BIS instruction in the first thread.

10. The method as recited in claim 1, further comprising executing a memory barrier instruction subsequent to completion of writing data to the first cache line.

11. A processor comprising:
a processor core, the processor core including a store queue configured to provide temporary storage for data to be written back to memory;
a first cache subsystem including a first cache coupled to the processor core; and
a second cache subsystem including a second cache coupled to the first cache;
wherein the processor core is configured to, responsive to execution of a first block initialization store (BIS) instruction within a first execution thread, perform a cache query for a first cache line to which data is to be written;
wherein responsive to a cache miss in the second cache responsive to the query, the first cache subsystem is configured to install the first cache line into the first cache and further configured to place the first cache line in an unordered dirty state in which it is exclusively owned by the first execution thread;
wherein the processor core is further configured to write data from the store queue into the first cache line responsive to execution of the first BIS instruction and one or more additional BIS instructions; and
wherein the second cache subsystem is configured to place the first cache line into an ordered dirty state responsive to receiving a cache coherence response, wherein the first cache line is not thread exclusive when in the ordered dirty state.

12. The processor as recited in claim 11, wherein the second cache subsystem is configured to maintain a directory of cache lines stored in the first cache, wherein the directory does not include any directory entry for the first cache line when the first cache line is in the unordered dirty state.

13. The processor as recited in claim 12, wherein the second cache subsystem is configured to cause the first cache line to be changed to the ordered dirty state and further configured to update the directory to include an entry for the first cache line when the first cache line is in the ordered dirty state.

14. The processor as recited in claim 13, wherein the second cache subsystem is configured to cause an update to the directory responsive to receiving the cache coherence response.

15. The processor as recited in claim 11, wherein the first cache subsystem is configured to:
inhibit contents of the first cache line from being written back when the first cache line is in the unordered dirty state;
inhibit snooping of the first cache line when the first cache line is in the unordered dirty state; and
inhibit the first cache line from being evicted from the first cache when in the unordered dirty state.

16. The processor as recited in claim 11, further comprising writing data from the store queue into the first cache line, responsive to execution of a plurality of BIS instructions including the first BIS instruction, until the first cache line is placed into the ordered dirty state.

17. A computer system comprising:
a processor including a first processor core and a second processor core, wherein each of the first and second processor cores is configured to concurrently execute instructions from two or more execution threads;
a level two (L2) cache subsystem including an L2 cache;
a level three (L3) cache subsystem including an L3 cache;
wherein the first processor core is configured to execute a first block unitization store (BIS) instruction from a first execution thread, and wherein responsive to execution of the first BIS instruction, the first processor core is configured to perform cache query;
wherein responsive to a miss in the L3 cache resulting from the cache query, the L2 cache subsystem is configured to install a first cache line in the L2 cache and place the first cache line in an unordered dirty state, wherein the first execution thread has exclusive ownership of the first cache line when in the unordered dirty state;
wherein the first processor core is configured to write data to the first cache line responsive to execution of the first BIS instruction and one or more BIS instructions in the first execution thread; and
wherein the L3 cache subsystem is configured to cause the first cache line to be changed to an ordered dirty state responsive to receiving a cache coherence response, wherein the first cache line is not thread exclusive when in the ordered dirty state.

18. The computer system as recited in claim 17, wherein the first and second processors include first and second store queues each configured to provide temporary storage for data to be written to a main memory of the computer system, and wherein the first processor core is configured to cause data to be written to the first cache line from the first store queue responsive to the execution of the first BIS instruction and one or more BIS instructions.

19. The computer system as recited in claim 17, wherein the L2 cache subsystem is configured to:
   inhibit writes to the first cache line by any instructions in any execution thread other than BIS instructions executed in the first execution thread;
   inhibit contents of the first cache line from being written back to the L3 cache or two a system memory when the first cache line is in the unordered dirty state;
   inhibit snooping of the first cache line when the first cache line is in the unordered dirty state; and
   inhibit the first cache line from being evicted from the L2 cache when the first cache line is in the unordered dirty state.

20. The computer system as recited in claim 17, wherein the L3 cache subsystem is configured to maintain a directory indicating which cache lines are currently stored in the L2 cache, wherein the directory includes no entry for the first cache line when the first cache line is in the unordered dirty state, and wherein the L3 cache subsystem is configured to place an entry into the directory corresponding to the first cache line responsive to receiving the cache coherence response and further configured to provide an indication to the L2 cache system causing the L2 cache subsystem to place the first cache line in the ordered dirty state.

* * * * *

UNITED STATES PATENT AND TRADEMARK OFFICE
CERTIFICATE OF CORRECTION

PATENT NO. : 9,892,039 B2
APPLICATION NO. : 14/691971
DATED : February 13, 2018
INVENTOR(S) : Luttrell et al.

It is certified that error appears in the above-identified patent and that said Letters Patent is hereby corrected as shown below:

In the Claims

In Column 10, Line 51, in Claim 17, delete "unitization" and insert -- initialization --, therefor.

Signed and Sealed this
Fourth Day of September, 2018

Andrei Iancu
*Director of the United States Patent and Trademark Office*